(12) United States Patent
Loncle et al.

(10) Patent No.: US 12,085,042 B2
(45) Date of Patent: Sep. 10, 2024

(54) POSITION SENSOR FOR AIRCRAFT NACELLE THRUST REVERSER DOOR

(71) Applicant: Safran Nacelles, Gonfreville l'Orcher (FR)

(72) Inventors: Alexis Loncle, Moissy Cramayel (FR); Laurent Georges Valleroy, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 30 days.

(21) Appl. No.: 17/666,244

(22) Filed: Feb. 7, 2022

(65) Prior Publication Data
US 2022/0333550 A1    Oct. 20, 2022

Related U.S. Application Data

(63) Continuation of application No. PCT/FR2020/051435, filed on Aug. 4, 2020.

(30) Foreign Application Priority Data

Aug. 7, 2019 (FR) .................................. 19/09044

(51) Int. Cl.
*F02K 1/76* (2006.01)
*F02K 1/62* (2006.01)
*F02K 1/70* (2006.01)

(52) U.S. Cl.
CPC ............... *F02K 1/766* (2013.01); *F02K 1/62* (2013.01); *F02K 1/70* (2013.01)

(58) Field of Classification Search
CPC ............... F02K 1/766; F02K 1/62; F02K 1/70
See application file for complete search history.

(56) References Cited

U.S. PATENT DOCUMENTS 168,915 A * 10/1875 Newsom ................. B66C 23/94
213/201
2,935,351 A * 5/1960 Garvey .................... E05B 83/38
292/201

(Continued)

FOREIGN PATENT DOCUMENTS

FR    3059646    6/2018

OTHER PUBLICATIONS

International Search Report for corresponding International Application PCT/FR2020/051435, mailed Nov. 13, 2020.

*Primary Examiner* — Ted Kim
(74) *Attorney, Agent, or Firm* — Burris Law, PLLC

(57) ABSTRACT

A position sensor for an aircraft nacelle thrust reverser door for an aircraft turbojet engine includes a target to be detected, a detector having a detection range and including a detection head configured to detect the target when it enters its detection range, and a target guide configured to guide the target in order to position it in the detection range of the detector. The detector is stationary relative to the target guide. In one form, the target is intended to be positioned on the door, and the detector and the target guide are intended to be positioned on a stationary structure of the thrust reverser. In another form, the target is intended to be positioned on a stationary structure of the thrust reverser, and the detector and the target guide are intended to be positioned on the door.

13 Claims, 2 Drawing Sheets

(56) References Cited

U.S. PATENT DOCUMENTS

| | | | | |
|---|---|---|---|---|
| 4,161,120 A * | 7/1979 | Cloarec | .................. | G01P 3/481 |
| | | | | 73/494 |
| 5,139,461 A * | 8/1992 | Kuti | ......................... | G01P 1/04 |
| | | | | 464/106 |
| 5,344,197 A * | 9/1994 | Rouzaud | ................ | F02K 1/766 |
| | | | | 292/201 |
| 5,712,621 A * | 1/1998 | Andersen | ............... | G08B 13/08 |
| | | | | 324/207.16 |
| 5,813,218 A * | 9/1998 | Kohlbacher | ............ | F02K 1/766 |
| | | | | 60/204 |
| 5,826,823 A | 10/1998 | Lymons et al. | | |
| 2007/0204442 A1* | 9/2007 | Falb | ....................... | A44B 11/25 |
| | | | | 24/633 |
| 2015/0204737 A1* | 7/2015 | Moran | ................... | G01L 1/122 |
| | | | | 29/428 |
| 2017/0342941 A1* | 11/2017 | Mears | ..................... | F01D 25/24 |
| 2019/0120173 A1 | 4/2019 | Ghandour et al. | | |
| 2019/0136591 A1* | 5/2019 | Schutt | .................... | E05B 83/10 |

* cited by examiner

POSITION SENSOR FOR AIRCRAFT NACELLE THRUST REVERSER DOOR

CROSS-REFERENCE TO RELATED APPLICATIONS

This application is a continuation of International Application No. PCT/FR2020/051435, filed on Aug. 4, 2020, which claims priority to and the benefit of FR 19/09044 filed on Aug. 7, 2019. The disclosures of the above applications are incorporated herein by reference.

FIELD

The present disclosure relates to a position sensor for an aircraft nacelle thrust reverser door.

BACKGROUND

The statements in this section merely provide background information related to the present disclosure and may not constitute prior art.

An aircraft is propelled by one or several propulsion unit(s) each comprising a turbojet engine housed within a tubular nacelle. Each propulsion unit is attached to the aircraft by a mast generally located under or over a wing or at the level of the fuselage of the aircraft.

In general, a nacelle has a tubular structure comprising an air inlet upstream of the turbojet engine, a middle section intended to surround a fan of the turbojet engine, a downstream section capable of accommodating thrust reversal means and intended to surround the combustion chamber of the turbojet engine, and generally terminates in an ejection nozzle whose outlet is located downstream of the turbojet engine.

The thrust reversal means are, during landing of the aircraft, intended to improve the braking ability thereof by redirecting forward at least part of the thrust generated by the turbojet engine. These means comprise a thrust reverser comprising movable thrust reverser elements, generally two movable thrust reverser elements, carried by the nacelle to move between a closed position (direct jet) in which the thrust reverser is inactive, and an open position (reverse jet) in which the thrust reverser is active, that is to say it returns at least part of the gas flow generated by the turbojet engine in the reverse direction to the flow guided by the nacelle. The downstream section of a nacelle therefore comprises a fixed structure and a movable structure.

In one type of thrust reversal, the movable reversal elements consist of doors. In another type of thrust reversal, the movable reversing elements consist of cascades.

The actuation of the thrust reverser doors is generally carried out thanks to actuators mounted on the nacelle and linked on the one hand to a motor, and on the other hand to the doors to maneuver these in a retraction or deployment direction over a stroke of the actuators comprised between the closed position and the open position of the doors.

Furthermore, it is known to provide a system for locking the doors in the closed position, in order to eliminate any risk of inadvertent opening of the doors. Usually, locking systems include locks in the form of hooks controlled by a control unit connected to position sensors of the doors, intended to provide the control unit with information necessary for the proper operation of the locking system, regarding the position of the doors.

A type of position sensor of the doors, generally called a "prox" sensor, comprises detection elements which consist of:
 a detector secured to the fixed structure of the nacelle, and
 a target secured to the door.

The detector may be a magnetic detector emitting a magnetic field, in which case the target is adapted to change the state of this magnetic field when it is substantially opposite the detector. Alternatively, the detector is an optical detector emitting a luminous flux, for example by means of a set of diodes or lasers, in which case the target include means for reflecting the luminous flux, such as a mirror, adapted to reflect the luminous flux emitted by the detector when the target is substantially opposite the detector. In another variant, the detector is an electromagnetic detector comprising a contact lever, which could be actuated by the target when the target is located substantially opposite the detector.

The detection capacity of these known sensors is located in a very low range. Indeed, they are able to detect a target generally disposed at a maximum distance of 5 mm. It is therefore necessary that the tolerances between the door and the fixed structure, and more particularly the tolerance between the detector positioned on the fixed structure and the target positioned on the door, are low, that is to say in the range of 5 mm. Thus, in order to guarantee the proper operation of such position sensors, the detection elements (detector and target) must be wedged by setting wedges, and devices for recentering the door (called spigots) must be disposed on the fixed structure. These recentering devices must have small clearances (in the range of 1 mm) to limit the relative displacements of the door, which generates significant forces at the interfaces, in particular at the level of the spigots.

Furthermore, these constraints require numerous setting operations when changing the door.

In order to overcome these concerns, it is known to use electromechanical-type sensors comprising a contact lever, which could be actuated by the target when the target displaces the lever. These sensors are called stow switch.

However, these types of sensors are heavy. Furthermore, their moving mechanism is susceptible to wear.

SUMMARY

This section provides a general summary of the disclosure and is not a comprehensive disclosure of its full scope or all of its features.

In one form of the present disclosure, a position sensor of a nacelle thrust reverser door for an aircraft turbojet engine includes:
 a target intended to be detected,
 a detector having a detection range and including a detection head configured to detect the target when it enters its detection range, and
 a target guide configured to guide the target to position it within the detection range of the detector,
 wherein the detector is fixed with respect to the target guide.

Thus, the target is able to enter the detection capacity range of the sensor, without requiring any setting wedge, maintenance intervention or a very accurate machining of the doors and of the fixed structure. The position sensor allows detecting the door in the closed position.

In one form, the sensor allows adjusting the dimensional dispersions and those due to the operation of a thrust reverser, by guiding the target in the detection range of the detector, and by conferring thereon a clearance in this detection range.

Furthermore, such a position sensor allows for a saving in mass and in manufacturing cost, and allows reducing the risks of detection error.

Moreover, the guide allows protecting the target. It acts as a protective fairing.

The guide is configured to receive the target to position it within the detection range of the detector.

In one form of the present disclosure, the sensor includes one or more of the following optional features considered alone or in any possible combination.

According to one form, the target is intended to be positioned on the door whose position is to be detected, and the detector and the target guide are intended to be positioned on a fixed structure of the thrust reverser.

In another form, the target is intended to be positioned on a fixed structure of the thrust reverser, and the detector and the target guide are intended to be positioned on the door whose position is to be detected.

According to one form, the detector is mounted on the target guide.

According to one form, the target is intended to be positioned on the door whose position is to be detected, and the detector and the target guide are intended to be positioned on the fixed structure of the thrust reverser.

According to this form, the guide comprises an opening into which is introduced the detection head of the detector so as to enable the detection of the target inserted into the guide.

According to one form, the target is configured to be located at a distance between 0 and 5 mm, and provides a range of 5 mm, from the detection head of the detector, when the target is inserted into the guide.

The guide allows positioning the target at such a distance. The guide is configured to position the target at a predetermined distance from the detection head.

According to one form, the position sensor is configured to send a signal to an external device when the target is within the detection range of the detector.

According to one form, the position sensor is a magnetic sensor.

According to this form, the target is adapted to change the state of this magnetic field when it is within the detection range of the detector.

According to this form, the target includes at least one portion made of a magnetic metallic material such as magnetic stainless steel, or martensitic stainless steel and more particularly 15-5 PH (martensitic stainless steel with about 15% Cr and 5% Ni), said portion being configured to be in the detection range of the detector when the target is inserted into the guide, and the guide is made of a non-magnetic material, such as an organic material or polytetrafluoroethylene (PTFE).

According to one form, the position sensor is an optical sensor.

According to this form, the position sensor emits a luminous flux for example by means of a set of diodes or lasers, and the target includes a means for reflecting the luminous flux, such as a mirror, adapted to reflect the luminous flux emitted by the detector when the target is within the detection range of the detector.

According to one form, the position sensor is an electromechanical sensor.

According to this form, the position sensor comprises a contact lever, which can be actuated by the target when the target is within the detection range of the detector.

According to one form, the guide is made of a non-magnetic material, such as an organic material or polytetrafluoroethylene (PTFE).

According to one form, the target is in the form of a flexible blade.

The flexibility of the blade enables an introduction of the blade into the guide without generating any effort. Thus, the position sensor according to the present disclosure is simple and passive, and allows positioning the target within the detection range of the detector.

According to one form, the target has a thickness of about 2 mm.

This thickness allows conferring thereon the flexibility is desired for the introduction thereof into the guide.

According to one form, the target has a variable thickness, the thickness being of about 2 mm at the detection range of the detector when the target is inserted into the guide.

According to one form, the target includes an elastic portion allowing conferring thereon flexibility for the introduction thereof into the guide.

According to one form, the guide has a groove in which the blade is adapted to be inserted.

The groove is disposed at a known distance from the detection head, in order to position the target within the detection range of the detector.

According to one form, the groove has rounded leading edges allowing guiding the introduction of the blade.

According to one form, the walls of the groove are made of a material with a very low adhesion so as to limit frictions with the blade and thus limit the wear of the blade or of the guide. These materials are, for example, polytetrafluoroethylene (PTFE), polyamide (PA66), polyetheretherketone (PEEK).

According to one form, the groove is substantially conical, the largest dimension being disposed at the introduction end of the target.

The length of the blade is limited so that it lies outside the field of the detector when the door is not in the closed position. Thus, the position sensor is able to detect the breakage of an element for retaining the door in the closed position, such as a locking system.

The present disclosure further concerns a nacelle for an aircraft turbojet engine, the nacelle having a longitudinal axis and comprising a fixed structure and a thrust reverser, the thrust reverser comprising:

a fixed structure, and at least one door, movable in rotation about an axis transverse to the longitudinal axis of the nacelle, between a closed position in which it provides aerodynamic continuity with the fixed structure of the nacelle during operation of the nacelle in direct jet, and an open position in which it opens a passage intended for the circulation of a secondary air flow diverted during operation of the nacelle in reverse jet, said nacelle being remarkable in that it comprises at least one position sensor of the door as previously described.

According to one form of the present disclosure, the nacelle includes one or more of the following optional features considered alone or in any possible combination.

According to one form, the target is positioned on the door whose position is to be detected, and the detector and the target guide are positioned on the fixed structure of the thrust reverser, In another form, the target is positioned on the fixed structure of the thrust reverser, and the detector and the target guide are positioned on the door whose position is to be detected.

According to one form, the detector and the guide are mounted on the fixed structure of the thrust reverser.

According to one form, the target is fastened on the door.

According to one form, the target is fastened on a central portion of the door. This allows having only one detection sensor to detect the position of the door.

According to one form, the nacelle includes a locking system of the door in the closed position comprising a door hook disposed on the door, intended to cooperate with a fixed hook disposed on the fixed structure of the thrust reverser, and the target is fastened on the door hook.

Thus, the target is disposed closest to the hook, which allows improving the sensitivity of the detection of closure of the door, and the sensitivity of the detection of breaking of the hook.

According to one form, the nacelle includes several locking systems of the door in the closed position, in one form, disposed at each circumferential end of the door.

In one form of the present disclosure, the nacelle includes a position sensor of the door at each locking system of the door.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
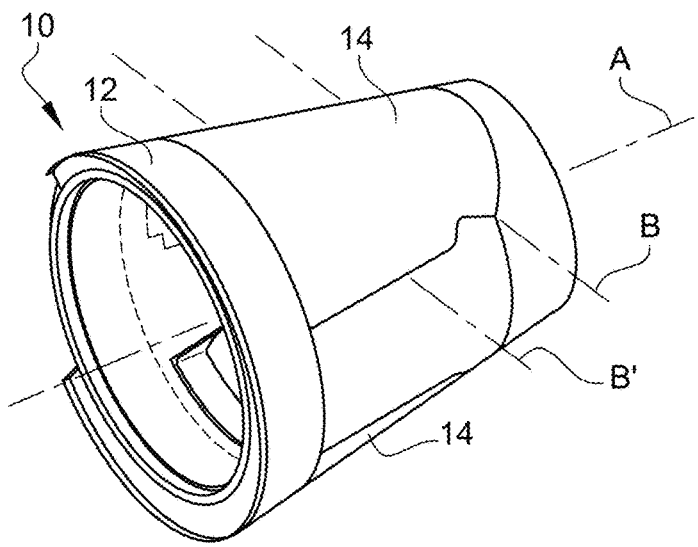
FIG. 1 is a schematic perspective view of a thrust reverser of a nacelle of aircraft turbojet engine in the closing position, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description and in the claims, identical, similar, or equivalent components will be referred to by the same reference numerals.

FIG. 1 illustrates a thrust reverser 10 of an aircraft turbojet engine nacelle.

The thrust reverser 10 has a longitudinal axis A corresponding to a longitudinal axis of the nacelle (not represented). It includes a fixed structure 12 and two doors 14 in the closed position in which they provide aerodynamic continuity with the fixed structure 12 of the thrust reverser and with the nacelle (not represented). The doors are movable in rotation about an axis B, B' transverse to the longitudinal axis A, between the closed position and an open position (FIG. 2) in which they open a passage intended for the circulation of a diverted secondary air flow.

Figure 2:
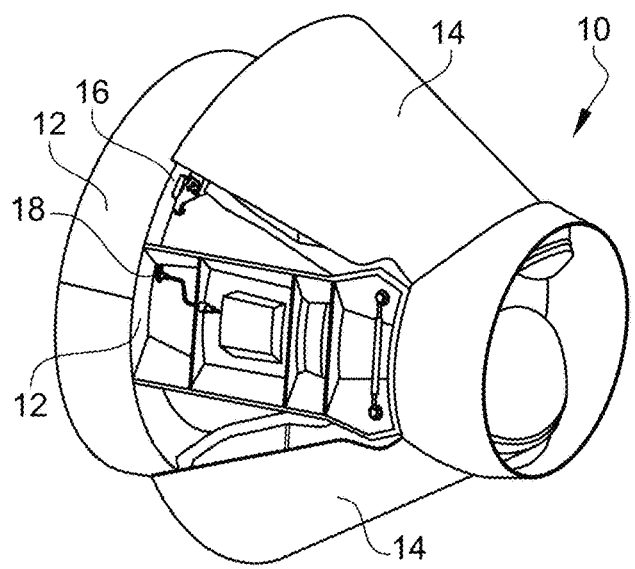
FIG. 2 is a schematic perspective view of the thrust reverser of FIG. 1 in the open position, allowing viewing a portion of the sensor according to the teachings of the present disclosure.

The thrust reverser 10 further includes a system 16 for locking each door 14 in the closed position and a position sensor 18 of each door 14, as will be seen with regards to FIG. 2.

FIG. 2 illustrates the thrust reverser 10 of FIG. 1 in the open position and allowing viewing a portion of the locking system 16 and of the position sensor 18 of a door 14.

Figure 3:
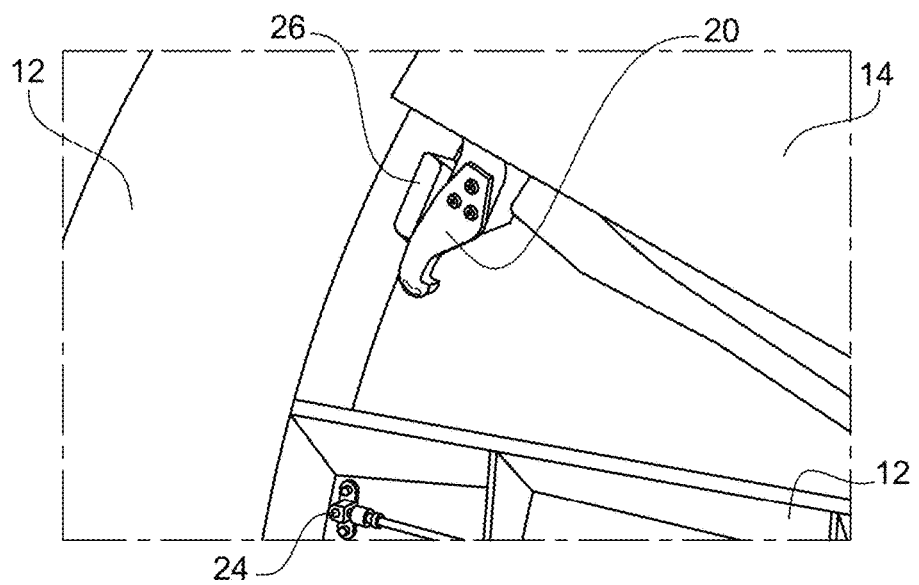
FIG. 3 is a schematic perspective view of an area of FIG. 2.

FIG. 3 illustrates in more detail the locking system 16 and the sensor 18 as represented in FIG. 2.

The locking system 16 comprises a door hook 20 disposed on the door 14, intended to cooperate with a fixed hook 22 (FIG. 4) disposed on the fixed structure 12 of the thrust reverser, but not visible in FIG. 3.

The position sensor 18 is a magnetic sensor. It includes a detector 24 fastened to the fixed structure 12 of the thrust reverser, a flexible blade 26 fastened to the door hook 20, and a guide 28 (FIG. 4) for the blade 26, intended to guide the blade to position it in the detection range of the detector 24 when the door 14 is in the closed position.

The blade 26 is a magnetic metallic material whereas the guide 28 (FIG. 4) is made of an organic material.

Figure 4:
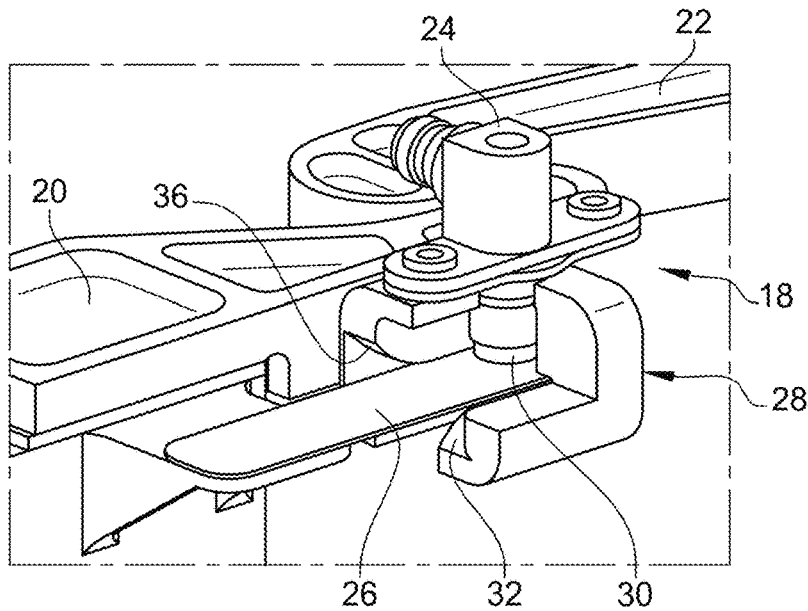
FIG. 4 is a schematic perspective view of a position sensor of a door of the thrust reverser of FIG. 1, the position sensor including a target and a guide, the guide being partially represented to facilitate the visualization of the target.
Figure 5:
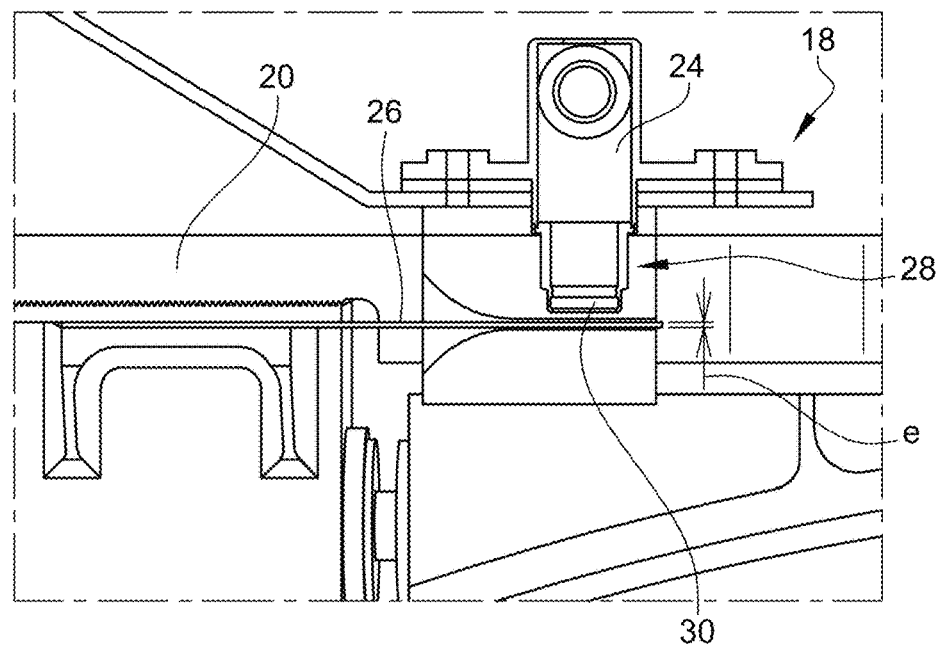
FIG. 5 is a schematic sectional view of the position sensor according to the teachings of the present disclosure.

FIGS. 4 and 5 illustrate in more detail the position sensor 18, the blade 26 being in the position inserted into the guide 28.

The detector 24 includes a detection head 30 configured to detect the blade 26 when it enters its detection range, that is to say when it is positioned in the guide opposite the detection head 30 and at a maximum distance in the range of 5 mm from the detection head.

The position sensor is configured to send a signal to an external device (not represented) when the blade 26 is detected by the detector 24.

The blade 26 is a target of the detector 24. It has a thickness "e" of 2 mm.

The guide 28 is partially represented in order to facilitate the visualization of the detector 24. It is fastened to the fixed structure 12 of the thrust reverser via the detector 24. It has a U-shape and includes a groove 32 in each of its two parallel branches 28A, 28B (FIG. 6), into which the blade 26 is intended to be inserted.

More particularly, the detector 24 is mounted on the guide 28, and the guide 28 includes an opening 34 (FIG. 6) in which is introduced the detection head 30 so that the detection head 30 is opposite the groove 32 to be able to detect the blade 26 when it is positioned in the groove 32. The distance between the groove 32 and the detection head 30 is 3 mm.

The groove 32 has rounded leading edges 36 in order to guide the introduction of the blade into the groove 32. Furthermore, its inner walls 38 (FIG. 6) are made of a material with a very low adhesion so as to limit frictions with the blade 26.

Figure 6:
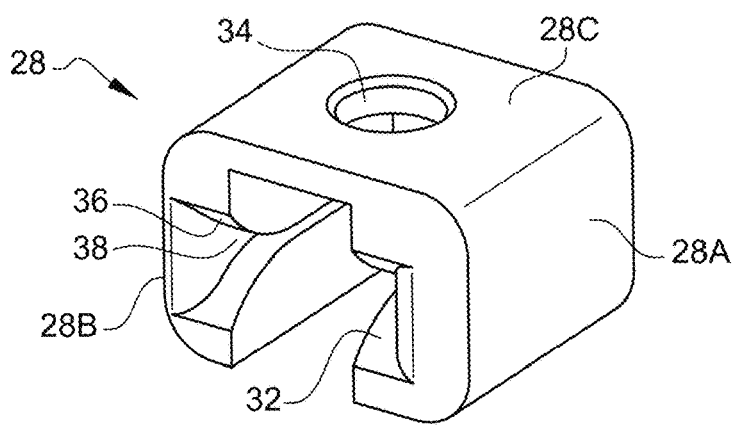
FIG. 6 is a schematic perspective view of the guide of the position sensor according to the teachings of the present disclosure.

FIG. 6 represents the guide 28 of the sensor 18 according to the present disclosure.

As indicated with regards to FIGS. 4 and 5, the guide 28 is a U-shaped block including grooves 32 in each of its parallel branches 28A, 28B. Each groove 32 has rounded leading edges 36 in order to guide the introduction of the blade into grooves 32. Furthermore, the inner walls 38 of each groove 32 are made of a material with a very low adhesion so as to limit frictions with the blade.

The guide 28 further includes an opening 34 in its base 28C, in order to enable the introduction of the detection head 30 of the detector 24 (FIGS. 4 and 5).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for an aircraft turbojet engine, the nacelle having a longitudinal axis and comprising a fixed structure and a thrust reverser, the thrust reverser comprising:
    a fixed structure; and
    at least one door movable in rotation about an axis transverse to the longitudinal axis of the nacelle, between a closed position in which the at least one door provides aerodynamic continuity with the fixed structure of the nacelle during operation of the nacelle in direct jet and an open position in which the at least one door opens a passage intended for circulation of a secondary air flow diverted during operation of the nacelle in reverse jet,
    wherein the nacelle comprises at least one position sensor, the position sensor comprising:
        a target intended to be detected and including a flexible blade;
        a detector having a detection range, wherein the detector includes a detection head configured to detect the target when the flexible blade of the target enters the detection range; and
        a target guide including a base and a pair of branches extending from the base and defining a groove between the pair of branches, the detection head being fixed to the base and extending through the base in a first direction, the flexible blade being movable and insertable into the groove in a second direction perpendicular to the first direction,
    wherein the groove has rounded leading edges configured to guide introduction of the flexible blade, the target being positioned on the door whose position is to be detected, the detector and the target guide being positioned on the fixed structure of the thrust reverser.

2. The nacelle according to claim 1, wherein the base of the target guide comprises an opening into which the detection head of the detector is introduced so as to enable detecting the target inserted into the target guide.

3. The nacelle according to claim 1, wherein the target is configured to be located at a distance between 0 and 5 mm, from the detection head of the detector, when the target is inserted into the target guide.

4. The nacelle according to claim 1, the position sensor being a magnetic sensor.

5. The nacelle according to claim 4, wherein the target includes at least one portion made of a magnetic metallic material, the at least one portion being configured to be within the detection range of the detector when the target is inserted into the target guide, and the target guide is made of a non-magnetic material.

6. The nacelle according to claim 5, wherein the magnetic metallic material is a magnetic stainless steel.

7. The nacelle according to claim 6, wherein the magnetic metallic material is a martensitic stainless steel.

8. The nacelle according to claim 5, wherein the non-magnetic material of the target guide is an organic material.

9. The nacelle according to claim 5, wherein the non-magnetic material of the target guide is polytetrafluoroethylene (PTFE).

10. The nacelle according to claim 1, wherein the target has a thickness of about 2 mm.

11. The nacelle according to claim 1, wherein the target includes an elastic portion, wherein flexibility of the elastic portion is configured to allow the target to be inserted into the target guide.

12. The nacelle according to claim 1, further comprising a locking system of the door in the closed position comprising a door hook disposed on the door configured to cooperate with a fixed hook disposed on the fixed structure of the thrust reverser, the target being fastened on the door hook, and the detector and the target guide being mounted on the fixed structure of the thrust reverser.

13. The nacelle according to claim 1, wherein the position sensor is configured to send a signal to an external device indicating the door is the closed position when the flexible blade is inserted into the groove and is within the detection range of the detector.

* * * * *